A. B. BOETTCHER.
VALVE GEAR.
APPLICATION FILED NOV. 3, 1919.
1,356,506. Patented Oct. 19, 1920.
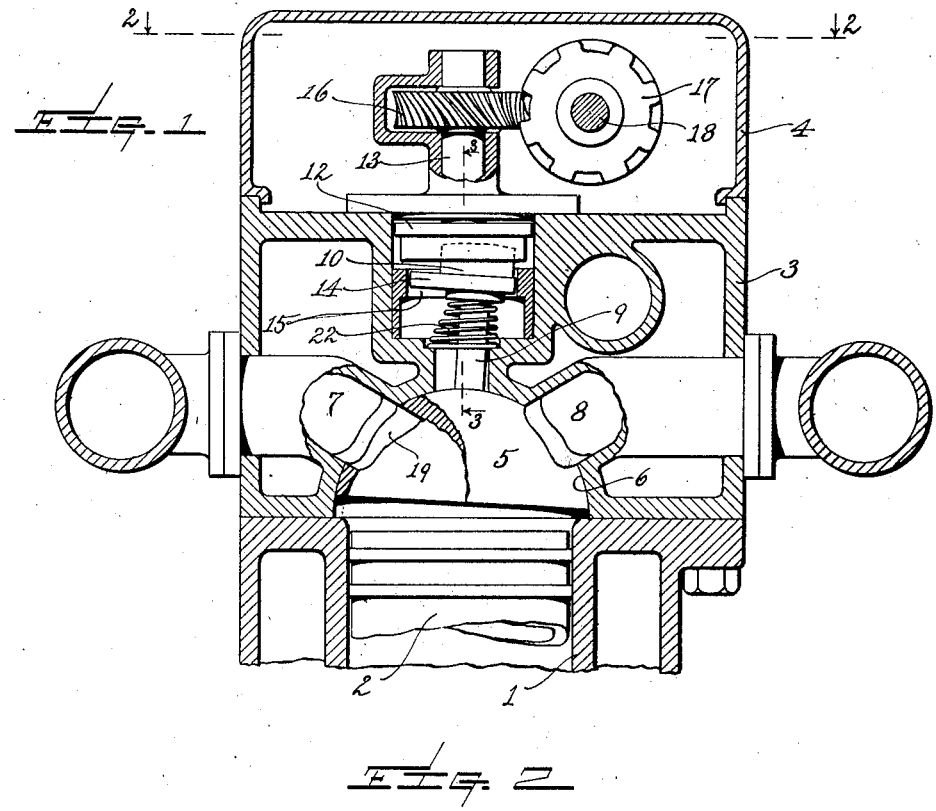
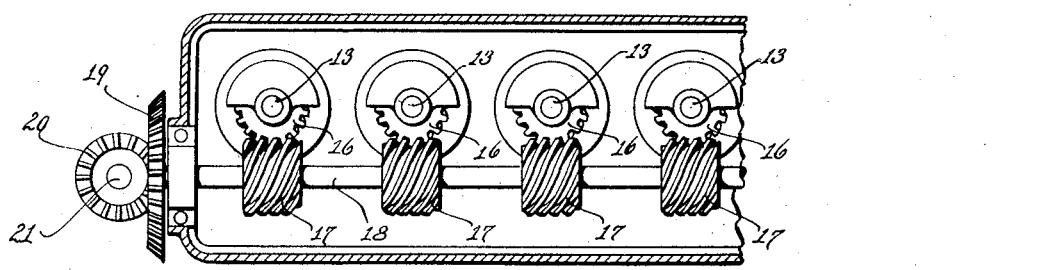
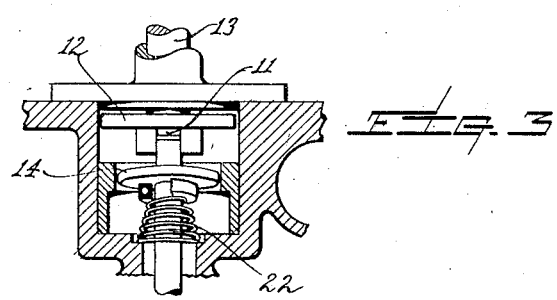
INVENTOR.
Albert B. Boettcher
BY
ATTORNEY.

UNITED STATES PATENT OFFICE.

ALBERT B. BOETTCHER, OF PITTSBURGH, PENNSYLVANIA.

VALVE-GEAR.

1,356,506.  Specification of Letters Patent.  Patented Oct. 19, 1920.

Application filed November 3, 1919. Serial No. 335,428.

*To all whom it may concern:*

Be it known that I, ALBERT B. BOETTCHER, a citizen of the United States of America, and resident of Pittsburgh, Allegheny county, Pennsylvania, have invented certain new and useful Improvements in Valve-Gears, of which the following is a specification.

My invention relates to improvements in valve gear, particularly valve gear for internal combustion engines and the like, and comprises improvements upon the valve gear of the patents to F. W. Ofeldt Nos. 1,238,559 and 1,238,560, dated August 28, 1917. The valve gear of said patents comprises a valve having both rotary and gyratory motion. My present invention comprises improved driving means for such a valve, as hereinafter described and particularly pointed out in the appended claims.

The object of my invention is to improve and simplify driving means for combined rotary and gyratory valves, particularly the valves of the said Ofeldt patents.

I will now proceed to describe my invention with reference to the accompanying drawings, and will then point out the novel features in claims:

Figure 1 shows a vertical section of the upper portion of the cylinder of an internal combustion engine, with a valve chamber and gear chamber thereabouts and their associated parts;

Fig. 2 shows a horizontal section on the line 2—2 of Fig. 1; and

Fig. 3 shows a fragmentary vertical section on the line 3—3 of Fig. 1.

In the drawings, 1 designates an engine cylinder, 2 a piston therefor, 3 a valve-chamber casing, and 4 a gear casing. 5 designates a combined rotary and gyratory valve, of generally hemispherical form, and 6 designates a seat therefor formed in the valve-chamber casing 3. 7 and 8 designate ports, of which either may be an admission port, and the other a corresponding exhaust port. 9 designates an upwardly projecting stem forming a part of the valve 5, and 10 a head for said stem, formed as a key adapted to work in a corresponding key-slot 11 (Fig. 3) of a disk 12 mounted upon an actuating shaft 13. 14 designates a cam also mounted upon the valve stem 9, said cam working within a cam-guide 15. The cam 14 is in effect an eccentric, and the cam-guide 15 is formed to permit rotation of that eccentric with the stem 9, while causing that eccentric and the valve stem to oscillate laterally as the valve stem is rotated.

For rotating said valve stem, the shaft 13 is provided with a screw gear 16; and engaging with such screw gear there is another screw gear 17, upon a shaft 18. As will be apparent, when the shaft 18 is rotated motion is communicated through the gears 16 and 17 to the shaft 13 and thence to the cam 14 and valve stem 9, and so to the valve 5. This supplies the desired rotary motion to said valve; and as such rotary motion proceeds the action of the cam 14 against the sides of the cam-guide 15 affords the desired oscillatory motion to the valve 5, the result being a gyratory motion of that valve, coupled with the rotary motion above referred to. The key 10, working in the key-slot 11, constitutes a simple and compact form of universal joint connection between shaft 13 and valve stem 9. This compactness is particularly desirable, because it is always desirable to reduce the height of the engine so far as possible; and this is one respect in which the construction herein described is an improvement over the various constructions of the Ofeldt patents above referred to.

19 designates a port in the valve 5 coacting with the ports 7 and 8 of the valve casing and its seat. As indicated in Fig. 2, there may be a plurality of gears 17 on the shaft 18, and coacting gear 16 on a plurality of shafts 13, such plurality of shafts 13 corresponding, of course, to a plurality of valves 5, in separate cylinders of an engine; Fig. 2, therefore, indicating a layout for a multiple cylinder engine, which, of course, may comprise as many cylinders as desired. Shaft 18 may be driven by any suitable means, for example, bevel gears 19 and 20, the latter on a shaft 21, which shaft may be understood to be driven in any suitable manner from the crank shaft or other convenient shaft of the engine; I do not deem it necessary to illustrate the crank shaft of the engine, or any particular means for driving the shaft 21, as such means are well known, and also are illustrated in the said Ofeldt patents.

22 designates a spring tending to hold the valve 5 against its seat. This spring yields readily to permit the gyratory motion of the valve.

What I claim is:

1. In an engine, the combination with an engine cylinder having a valve seat, of a valve on said seat adapted for a combined rotary and gyratory motion, a rotary driving member for said valve, a universal joint connecting said driving member and valve, and cam means arranged to enforce gyration of said valve during its rotation.

2. In an engine, the combination with an engine cylinder having a valve seat, of a valve on said seat adapted for a combined rotary and gyratory motion, a rotary driving member for said valve, a universal joint connecting said driving member and valve, a cam on said shaft, and a cam-guide against which said cam works, said cam-guide arranged to enforce gyration of said valve during its rotation.

3. In an engine, the combination with an engine cylinder having a valve seat, of a valve on said seat adapted for a combined rotary and gyratory motion, a rotary driving member for said valve, a key-and-slot universal joint connecting said driving member and valve, and cam means arranged to enforce gyration of said valve during its rotation.

4. In an engine, the combination with an engine cylinder having a valve seat, of a valve on said seat adapted for a combined rotary and gyratory motion, said valve having a projecting stem, a rotary driving member for said valve, a universal-joint connection between said driving member and valve comprising a slot member and a key member, one of said members connected to said rotary driving member and the other of said members connected to said valve stem, and cam means arranged to enforce gyration of said valve during its rotation.

5. In an engine, the combination with an engine cylinder having a valve seat, of a valve on said seat adapted for a combined rotary and gyratory motion, a rotary driving member for said valve, a universal joint connecting said driving member and valve, and cam means arranged to enforce gyration of said valve during its rotation, and comprising a cam mounted on said stem, and a fixed cam-guide surrounding the same.

6. In an engine, the combination with an engine cylinder having a valve seat, of a valve on said seat adapted for a combined rotary and gyratory motion, said valve having a stem and said engine cylinder having a chamber, cam means arranged to enforce gyration of said valve during its rotation, and comprising a cam and a cam-guide located in said chamber, the one mounted upon the valve stem and the other fixedly mounted in said chamber, and a universal joint connection between said driving member and valve stem.

In testimony whereof I have signed this specification in the presence of two subscribing witnesses.

ALBERT B. BOETTCHER.

Witnesses:
ALEXANDER BLACK,
ALBERT P. STEITZEL.